(12) United States Patent
Lin et al.

(10) Patent No.: US 10,462,062 B2
(45) Date of Patent: Oct. 29, 2019

(54) MEMORY EFFICIENT PACKET CLASSIFICATION METHOD

(71) Applicant: Hewlett Packard Enterprise Development LP, Houston, TX (US)

(72) Inventors: Qun Yang Lin, Beijing (CN); Jun Qing Xie, Beijing (CN); Xiaofeng Yu, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 265 days.

(21) Appl. No.: 15/500,544

(22) PCT Filed: Aug. 15, 2014

(86) PCT No.: PCT/CN2014/084538
§ 371 (c)(1),
(2) Date: Jan. 31, 2017

(87) PCT Pub. No.: WO2016/023232
PCT Pub. Date: Feb. 18, 2016

(65) Prior Publication Data
US 2017/0222937 A1    Aug. 3, 2017

(51) Int. Cl.
*H04L 12/851* (2013.01)
*H04L 29/06* (2006.01)
*H04L 12/741* (2013.01)

(52) U.S. Cl.
CPC ........ *H04L 47/2483* (2013.01); *H04L 45/745* (2013.01); *H04L 63/0236* (2013.01); *H04L 63/0263* (2013.01); *H04L 69/22* (2013.01)

(58) Field of Classification Search
None
See application file for complete search history.

(56) References Cited

U.S. PATENT DOCUMENTS

| 7,747,553 | B2 | 6/2010 | Liang et al. |
| 2009/0190592 | A1 | 7/2009 | Hsieh et al. |
| 2011/0038375 | A1 | 2/2011 | Liu et al. |
| 2012/0096220 | A1 | 4/2012 | Liu et al. |

FOREIGN PATENT DOCUMENTS

| CN | 102148746 A | 8/2011 |
| CN | 102204180 | 9/2011 |
| CN | 103986667 | 8/2014 |
| WO | WO-2012081148 | 6/2012 |

OTHER PUBLICATIONS

Chen, C et al, "Fast Packet Classification Using Bit Compression with Fast Boolean Expansion", Feb. 2, 2007.

*Primary Examiner* — James P Duffy
(74) *Attorney, Agent, or Firm* — Sheppard Mullin Richter & Hampton (57) ABSTRACT

A SCI (Split, Compression and Intersection) packet classifier, wherein the SCI packet classifier comprises a construction module to generate rule ID array, h pairs of ISG and three binary search trees, and a lookup engine to look up the binary search trees and ISGs to find the highest priority rule matching the incoming packet and to output a corresponding rule ID.

15 Claims, 3 Drawing Sheets

MEMORY EFFICIENT PACKET CLASSIFICATION METHOD

BACKGROUND

One of the most important requirements for today's high-performance forwarding engines of Internet is the ability to identify the packets that belong to a certain flow (a flow is defined by some rule; a collection of rules is called a classifier) and apply an action necessary to satisfy an increasing set of service requirements. Identification of the flow of an incoming packet is termed packet classification.

Packet classification is a critical function of switches, routers and firewalls. Typical applications include access control list of firewalls, flow tables of SDN routers/switches, packet classifier of QoS routing and so on. A packet classifier is designed to compare a number of header fields of an incoming packet against a set of rules and determine an action from matched rules. Sample actions include forwarding the packet, rejecting the packet, routing the packet to a particular application, etc. The packet classifier searches the rules to find the highest priority one matching the incoming packet.

The most common used solution in commercial products for packet classification is based on TCAM (Ternary Content Addressable Memory), which relies on hardware to process a packet in one clock cycle. However, it is inflexible and power hungry, and is reaching the capacity limit of the technology.

Therefore, the industry is seeking algorithmic solutions instead. In recent years, many algorithms have been proposed for packet classification, such as HiCuts, HyperCuts, HyperSplit, RFC and HSM.

However, the size of rule set grows rapidly with the exploding of Internet applications. For large rule sets, existing algorithms are generally based on decomposition or decision-tree, which faces a large amount of rule replication. Moreover, the memory consumption and construction time grows rapidly with the size of rule set, which significantly reduces the scalability performance. The method presented in this disclosure is called Split, Compression and Intersection (SCI).

BRIEF DESCRIPTION OF THE DRAWINGS

Some embodiments are described with respect to the following figures.

Throughout the drawings, identical reference numbers designate similar, but not necessarily identical, elements.

DETAILED DESCRIPTION

In the disclosure, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the true spirit and scope of the examples.

The purpose of packet classification is to classify packets according to a given rule set. Although existing packet classification has high theoretical complexity, real-life packet classification rules have replications that can be exploited to improve classification rate and reduce memory usage. Scalability is a big challenge for the packet classification. In general, there are a lot of packet classification algorithms which can be mainly categorized into decomposition based and decision-tree algorithms. The decomposition based algorithms cannot efficiently handle large rule sets, so this kind of algorithm is rarely used in commercial high end products of routers, switches and firewalls. Currently, the decision-tree based packet classifier seems to outperform other algorithmic approaches as it supports parallel lookup with pipeline design.

However, rules are greatly replicated during the cutting procedure of decision-tree based packet classification, which significantly lower the performances (including memory efficiency and construction time) of the algorithm.

To reach high-performance and flexible packet classification, a SCI (Split, Compression and Intersection) based packet classification has been presented, which handles the different matching in separate stages and can satisfy the memory requirement by significantly compressing the original rule set to a small memory footprint.

It combines the advantages of both decomposition based algorithms and decision-tree based packet classification by using the divide—and—conquer principle.

Decision-tree based classification algorithms use geometric cutting to eliminate rules. The selecting decision criterion is analogous to choosing a cutting of the space. During the cutting procedure, rules may be replicated in multiple subspaces. A key problem of the decision-tree based packet classification is how to reduce the rule replication, which grows dramatically with the number of fields and the size of rule set.

Firstly, what is rule replication? For instance, to assume a rule set with only one field which can be set as a range of values like port number. A sample rule set is shown in Table 1.

TABLE 1

Sample rule set (one field)

| Rule ID | Field-X |
|---|---|
| 1 | 10-30 |
| 2 | 50-80 |
| 3 | 0-100 |

If to extend the number of fields to two, as shown in Table 2, it can present the rule set in a two dimensional space.

TABLE 2

Sample rule set (two fields)

| Rule ID | Field-X | Field-Y |
|---|---|---|
| 1 | 10-30 | 10-80 |
| 2 | 50-80 | 10-90 |
| 3 | 0-100 | 30-60 |

In order to reduce the rule replication, the rule distribution is firstly analyzed according to the overlapping frequency, i.e., how many segments a rule is replicated in.

For any given rule set, the overlapping frequencies of rules are firstly calculated, and then the distribution of overlapping frequencies is gathered. After that the rule set is split into a number of groups according to the distribution of overlapping frequencies. The split procedure can be performed using any combination of the fields. For instance, the rule set can be split according to the overlapping frequencies of only one field (e.g., source IP address(SA)), or can be split according to the overlapping frequencies of two fields (e.g., source IP address and destination IP address(DA)), and so on.

For each group, the bound values for each of the following three fields are firstly collected: source port, destination port and protocol. Next the rule set is distributed into a list of segments according to the boundary of the three fields, with each segment containing a sub-rule set (a rule could be duplicated in multiple segments). The number of segments is the product of the sub-segment numbers of the three fields. The list of segments of a group is called a g-Set Array; each segment contains a number of rules matching a specified range of the 3-tuples.

At this stage, a binary search tree for each of the source, destination port and protocol field is also built to speed up the lookup process in the lookup engine.

After the split operation, a compression method can be applied to construct the lookup data structure for each group.

A packet classifier is designed to compare a number of header fields of an incoming packet against a rule set and determine an action from matched rules. The action associated with a rule can be forwarding the packet, rejecting the packet, routing the packet to particular application etc.

A rule set can be represented by a tree. The tree can be a binary tree, which has a number of nodes (and edges connecting the nodes) that can be searched by a lookup engine for processing a packet.

As networks become larger, the amount of rule sets (as represented by a tree) can be relatively large. As a result, it may not be possible to store the entire tree in a relatively high-speed memory of the lookup engine, which can increase the amount of time involved in performing a search of the tree, since it is more likely that the lookup engine may have to access slower speed storage of the lookup engine to complete the search of the tree.

For improved efficiency and performance, a tree can be compressed to form a shape graph. The shape graph is a compressed representation of a tree, where certain groups of nodes of the tree can be combined into corresponding nodes of the shape graph. The shape graph thus consumes a smaller amount of storage space than the respective tree.

Instead of performing a search of a tree, a lookup engine can perform a search of the shape graph. Since it is more likely that the entirety of the shape graph (or at least a larger portion of the shape graph) can be stored in higher speed memory of the lookup engine, lookup operations for processing packets can occur at higher speeds.

Searching the shape graph based on IP address information (including source IP address and destination IP address) of a packet to be classified can allow the lookup engine to determine a sub-rule set for the packet. The sub-rule set includes the rules matching the address information of the packet.

The sub-rule set for a given packet may be determined by identifying a node in the shape graph corresponding to a longest matching prefix for a source/destination address in the packet. In some examples, the address contained in a packet can be an Internet Protocol (IP) address, such as an IPv4 or IPv6 address.

In some examples, a prefix for an address can refer to a portion of an IP address that is used to identify a network section. A network can be divided into multiple network sections. An IP address can have two portions: a first portion (the prefix) that identifies a network section, and a second portion that identifies a host device within the identified network section.

A shape graph is traversed based on the prefix for a source/destination address in an incoming packet. Different prefixes (of varying lengths) cause traversal to different nodes of the shape graph. Some of the nodes of the shape graph are associated with sub-rule set, while other nodes of the shape graph are not associated with sub-rule set.

The shape graph can be associated with an indexing array. The indexing array has a number of positions, where each position is pointed to by a respective index. The positions of the indexing array include respective sub-rule set.

Thus, the shape graph associated with the indexing array can be referred to as an Indexed Shape Graph (ISO).

Upon receiving a packet, a search (lookup) of the shape graph can be performed, which would produce a respective index value that can be used to index into the indexing array to retrieve a corresponding sub-rule set at the indexed position in the indexing array.

After the split operation, each of the groups then is compressed into a pair of ISG, one for SA field and the other for DA field.

For each segment, the source IP address (SA) of the rules is used to construct a binary search tree. So a forest of SA binary search tree for g-Set Array is gotten. The SA forest is then compressed into a SA ISG. Similarly, the DA forest for a g-Set Array is compressed into a DA ISG. Thus finally N pairs of ISG for the N groups are gotten, including N SA ISGs and N DA ISGs. Moreover, for each SA or DA binary search tree, there is an associated index array, which is called i-Set Array. Each element of the i-Set Array contains a sub-rule set matching the specified source or destination IP prefix.

Then, intersection is leveraged to calculate the matched rule with highest priority in intersection operation. There may be a number of rules matching an incoming IP packet, but only the highest priority one is returned as the result. The ID of the matched rule is stored in a data structure named Rule ID Array.

The three binary search trees and the N pairs of ISG will be downloaded into FPGA for the usage of lookup engine.

For an incoming IP packet, the binary search trees of source is firstly searched, the segment index of each field is fast located by source port, destination port and protocol field. Then the root entries of N pairs of ISG are calculated based on the above indexes by Index Mapping component. After that, the SA ISG and DA ISG in the N pairs of ISG are searched through pipelines in parallel; each of which returns a matched rule ID. The Priority Resolver component returns the highest priority one of the N rule IDs.

There are three types of rule update requires: modification, insertion and deletion of a rule. An update of rule may affect one or several segments in the g-Set Array. Then the SA/DA trees of the affected segments are reconstructed and the ISG is updated accordingly to represent the change in the trees. A newly updated ISG is constructed in CPU and then downloaded into FPGA for lookup operation.

In the following, certain examples according to the present disclosure are described in detail with reference to the drawings.

Figure 1:
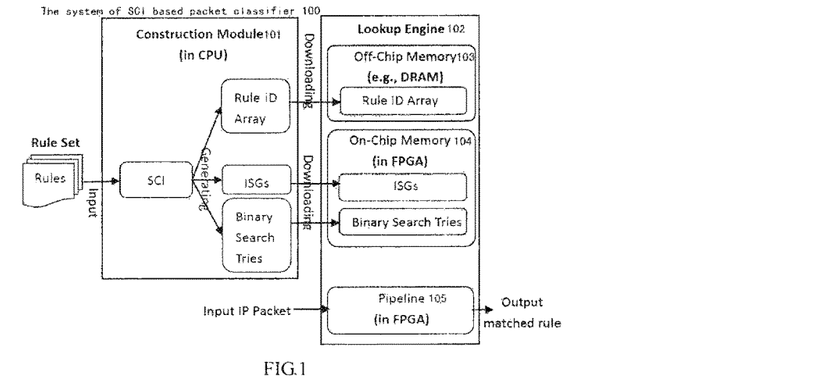
FIG. 1 illustrates an example system architecture of SCI based packet classifier according to an example herein.

FIG. 1 illustrates system architecture of SCI based packet classifier according to an example herein. The system of SCI based packet classifier 100 consists of a Construction Module 101 and a Lookup Engine 102. The Construction Module 101 may be deployed in a CPU. The Construction Module 101 maintains a SCI based packet classification in its storage device. The Lookup Engine 102 is designed for commodity hardware like FPGA (Field Programmable Gate Array) with pipeline; the Lookup Engine 102 consists of Off-chip Memory 103, On-Chip Memory 104 and Pipeline 105. And the Off-Chip Memory 103 could be DRAM (Dynamic Random Access Memory), such as FPRAM, EDORAM, DDR RAM, RDRAM, SGRAM and WRAM etc. The On-Chip Memory 104 and Pipeline 105 may be deployed in a FPGA. The FPGA could be used with the On-Chip Memory 104 tens of Mbits.

In packet classification, there is a need to process multi-dimensional data including source IP address (SA), destination IP address (DA), source port number, destination port number and protocol. The SA and DA fields are presented as prefixes. While the source port number and destination port number are usually set as ranges. The protocol can be a bit mask or a range.

The working procedure of the system of SCI based packet classifier 100 is discussed in details. For an incoming IP packet, a Rule Set is firstly input into the Construction Module 101 and the incoming IP packet is input into the Pipeline 105 in the Lookup Engine 102.

In the Construction Module 101, the rule distribution is firstly analyzed according to the overlapping frequency, i.e., how many segments a rule is replicated in. For instance, the one-field rule set shown in Table 1 can be presented with an axis shown in example 1, which contains 5 segments from S1 to S5. The overlapping frequency of rule 3 is 4 as it is replicated in all the 5 segments. Either rule 1 or rule 2 covers only one segment, i.e. S2 and S4 respectively. So the overlapping frequency of either is equal to 0.

In another instance, the two-field rule set shown in Table 2 is presented in a two-dimensional space shown in example 2. The overlapping frequency of rule 1 is equal to 2, as it is replicated in three regions including Region 2, Region 3 and Region 4. The overlapping frequencies of rule 2 and rule 3 are 2 and 4 respectively.

The overlapping frequencies of rules are calculated, and then the distribution of overlapping frequencies is gathered. After that the rule set is split into a number of groups according to the distribution of overlapping frequencies. The split procedure can be performed using any combination of the fields. For instance, the rule set can be split according to the overlapping frequencies of only one field (e.g., source IP address(SA)), or can be split according to the overlapping frequencies of two fields (e.g., source IP address and destination IP address(DA)), and so on.

For each group, the bound values for each of the following three fields are firstly collected: source port, destination port and protocol. Next the rule set is distributed into a list of segments according to the boundary of the three fields, with each segment containing a sub-rule set (a rule could be duplicated in multiple segments). The number of segments is the product of the sub-segment numbers of the three fields. The list of segments of a group is called a g-Set Array; each segment contains a number of rules matching a specified range of the 3-tuple.

During this split operation, a binary search tree for each of the source port, destination port and protocol field is also built to speed up the lookup process in the lookup engine.

Figure 2:
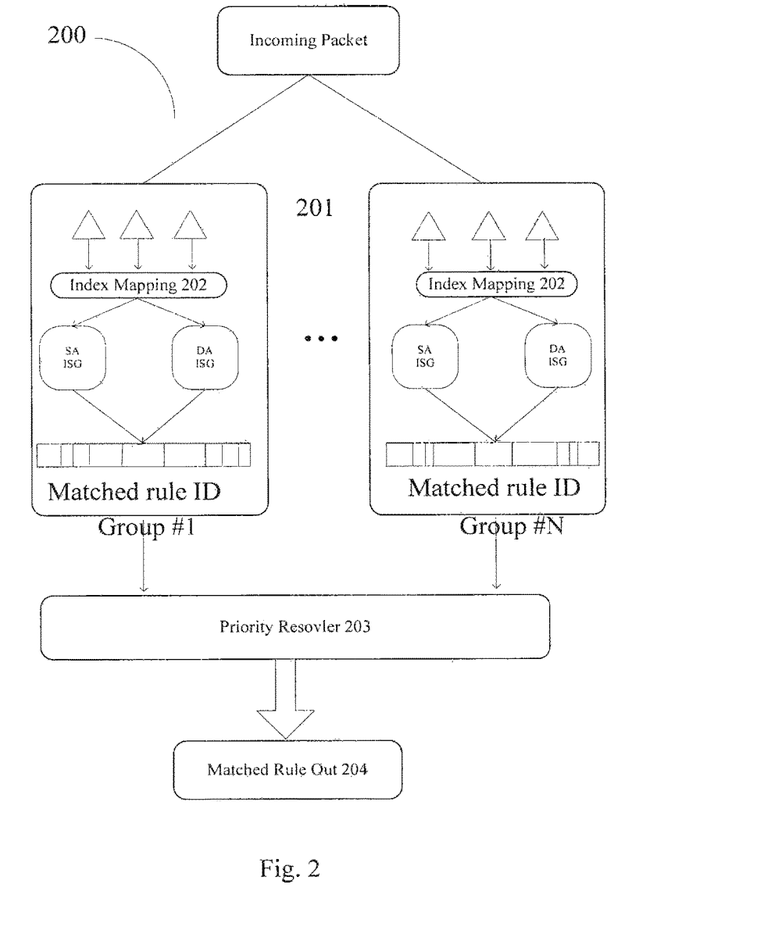
FIG. 2 illustrates an example pipeline design of a SCI lookup engine according to an example herein.

FIG. 2 illustrates a pipeline design of a SCI Lookup Engine 200 according to an example herein. The SCI lookup engine comprises an On-Chip memory, which is used to store the SA ISG, the DA ISG, and the three binary search trees, an index mapping component, and a Priority Resolver component. For an incoming IP packet, the SCI lookup engine searches the binary search trees to locate segment index of each field of the incoming IP packet in block 201, then the index mapping component calculates root entries of N pairs of ISG based on the segment indexes in block 202, and the SCI lookup engine searches source IP address and destination IP address in the N pairs of ISG through pipelines in parallel in block 203. Finally, the Priority Resolver component returns the highest priority matched rule ID in block 204.

For example, for an incoming IP packet which has been processed by SCI in the Construction Module 101, the Pipeline 105 in Lookup Engine 102 searches the binary search trees of source port, destination port and protocol to fast locate the segment index of each field. Then the root entries of N pairs of ISG are calculated based on the above indexes by Index Mapping component. To illustrate the working scheme of Index Mapping component, a simple instance is given as follows: Assume the index numbers of source, destination port and protocol are x, y and z respectively. The product of x, y and z can be used as the index number to locate the corresponding ISG entries.

After that, the three binary search trees are searched; the SA ISG and DA ISG in the N pairs of ISG are combined through pipelines in parallel; each of which returns a matched rule ID. Finally, the Priority Resolver component returns the highest priority (i.e., minimum) one of the N rule IDs.

In an example, the products of the index numbers of source port, destination port and protocol are used as index numbers to locate the corresponding ISG entries.

Furthermore, some memory efficient data structure can be used, such as binary search tree and hash, for the Index Mapping component.

Figure 3:
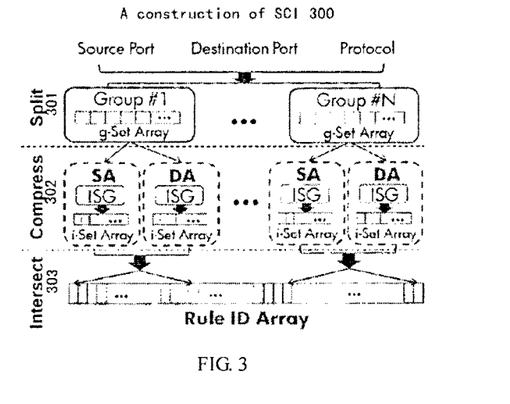
FIG. 3 depicts an example construction of SCI according to an example herein.

FIG. 3 depicts a construction of SCI 300 according to an example herein. The construction of SCI 300 can be separated into three stages: Split stage 301, Compression stage 302 and Intersection stage 303.

For an incoming IP packet including five fields: source IP address (SA), destination IP addresses (DA), source port, destination port and protocol. In the Split stage 301, the rule distribution is firstly analyzed according to the overlapping frequency. Secondly, the overlapping frequencies of rules are calculated, and then the distribution of overlapping frequencies is gathered. After that the rule set is split into a number of groups named a Rule ID Array according to the distribution of overlapping frequencies. The split procedure can be performed using any combination of the fields. In the compression stage 302, each of the groups then is compressed into a pair of ISG, one for SA field and the other for DA field. For each segment, using the source IP address (SA) of the rules to construct a binary search tree. So a forest of SA binary search tree is got. The SA forest is then compressed into a SA ISG. Similarly, the DA forest is compressed into a DA ISG. Thus finally get N pairs of ISG for the N groups, including N SA ISGs and N DA ISGs. Moreover, for each SA or DA binary search tree, there is an associated index array, which called i-Set Array. Each element of the i-Set Array contains a sub-rule set matching the specified source or destination IP prefix.

Finally, in the intersection stage 303, intersection is leveraged to combine the SA and DA ISGs and the matched rule ID is calculated.

Figure 4A:
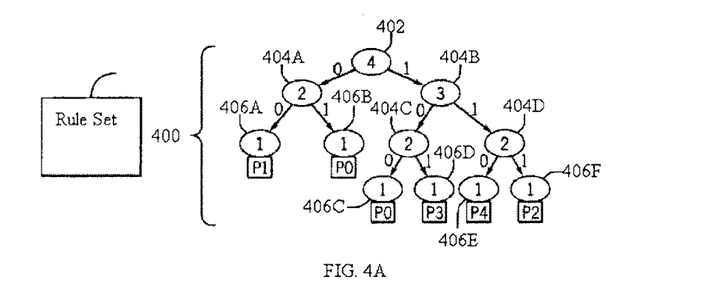
FIG. 4A-4B depicts an example construction of ISG according to an example herein.

FIG. 4A is a schematic diagram of a shape graph that is compressed from a binary tree. A binary tree 400 with edges that may be used to organize the prefixes and the sub-rule set within the rule set. The tree 400 may include a root node 402 located at the top of the tree 400, a number of intermediate nodes 404 (404A, 404B, 404C, 404D shown) branching off the root node 402, and a number of leaf nodes 406 (406A-406F shown) located at the bottom of the tree 400 and branching off the intermediate nodes 404 or the root node 402.

Construction of the tree 400 may be performed by merging the prefixes within the example rule set provided above such that the root node 402 corresponds to the starting point of the lookup procedure for a prefix of an incoming packet to be classified. Each leaf node 406 is associated with a specific sub-rule set (contained in the example rule set) obtained by traversing from the root node 402 to the leaf node 406 based on the prefix of the incoming packet. In the example of FIG. 4A, the leaf nodes 406A, 406B, 406C, 406D, 406E, and 406F are associated with respective sub-rule set P1, P0, P0, P3, P4, and P2.

As shown in FIG. 4A, each edge between nodes is labeled with a "0" or "1," which correspond to respective bits of a prefix. For example, given a prefix having the most significant bits as "101," the tree 400 is traversed as follows. Starting at the root node 402, the most significant bit "1" in the prefix causes the traversal to take the right branch from the root node 402, which leads to the node 404B. The second most significant bit "0" in the prefix causes the traversal to take the left branch from the node 404B, which leads to the node 404C. The third most significant bit "1" in the prefix causes the traversal to take the right branch from the node 404C, which leads to the node 406D. The node 406D is associated with sub-rule set P3, as shown in FIG. 4A.

Compressing the tree 400 into a shape graph may be accomplished by traversing all the nodes 402, 404, and 406 within the tree 400, which starts from the bottom of the tree 400. Each node 402, 404 or 406 is assigned an indicator. The indicator may be used to merge the nodes 402, 404, and 406 into a number of node groups, referred to herein as "sub-tree", where each sub-tree includes identical, or isomorphic, nodes 402, 404, or 406. A first node is identical to a second node if the first and second nodes have the same shape, and they are associated with the same sub-rule set flag value. The shape of a node is based on its interconnection to child nodes (if any). The sub-rule set flag indicates whether or not the node of the tree is a dark node (in other words, whether the node is associated with sub-rule set). The sub-rule set flag has a first value to indicate that the respective node is associated with sub-rule set, and a second value to indicate that the respective node is not associated with sub-rule set.

For example, the leaf nodes 406A-406F are considered to be identical, since they share the same shape (each leaf node dose not include any child nodes) and they each have share the same sub-rule set flag value (set to the first value to indicate that the leaf nodes are each associated with sub-rule set). Therefore, the leaf nodes 406A-406F can be considered to be part of a sub-tree that can be merged into a respective node of the shape graph. Each of the leaf nodes 406A-406F are assigned an indicator "1" as depicted in the over corresponding to each leaf node.

Similarly, the nodes 404A, 404C, and 404D are considered to be identical, since each of the nodes 404A, 404C, and 404D have child nodes that are leaf nodes, and each has a sub-rule set flag set to the second value to indicate that the nodes are not associated with sub-rule set. The nodes 404A, 404C, and 404D can be considered to be part of a sub-tree, and are assigned an indicator "2."

The node 404B has child nodes 404C and 404D that are intermediate nodes with child leaf nodes, and thus the node 404B has a different shape from nodes 404A, 404C, and 404D. Accordingly, the node 404B is part of another sub-tree and is assigned an indicator "3." The root node 402 also has a different shape from the other nodes of the tree 400, and is assigned an indicator "4."

Each sub-tree may include any number of nodes of a tree, or, in some cases, may include only one node. Further, according to the example shown in FIG. 4A, the indicator assigned to a node in the tree 400 is represented by a real number in {1, 2, . . . , n}, wherein n identifies the sub-tree. However, it is to be understood that any other type of indicator may be used. The indicator can be referred to as a shape identifier (or shape ID), since the indicator identifies a shape of the corresponding sub-tree.

As discussed above, in order to form the shape graph, traversal of the nodes 402, 404, and 406 may be performed starting from the bottom of the tree 400, i.e. starting with the leaf nodes 406. All the leaf nodes 406 may be assigned the same shape ID, e.g. shape ID "1" as shown in FIG. 4A. Then, moving upwards from the leaf nodes 406, the left and right intermediate nodes 404 may be examined, and groups of isomorphic intermediate nodes 404 may be assigned the same shape ID. For example, as shown in FIG. 4A, the intermediate nodes 404A, 404C, and 404D are isomorphic and share the same sub-rule set flag value and, thus, may be assigned the same shape ID, e.g. the shape ID "2." The process of forming the shape graph continues until the root node 402 is reached, at which point all of the sub-trees of the tree 400 have been identified and assigned respective shape IDs. The sub-trees are merged to obtain the shape graph.

The tree merging process for compressing a tree into a shape graph is effectively a labeling process from the bottom of the tree to the top of the tree, and nodes are merged if the nodes are identical in shape (the nodes have an identical left sub-tree, and an identical right sub-tree), and the nodes share the same sub-rule set flag value.

Figure 4B:
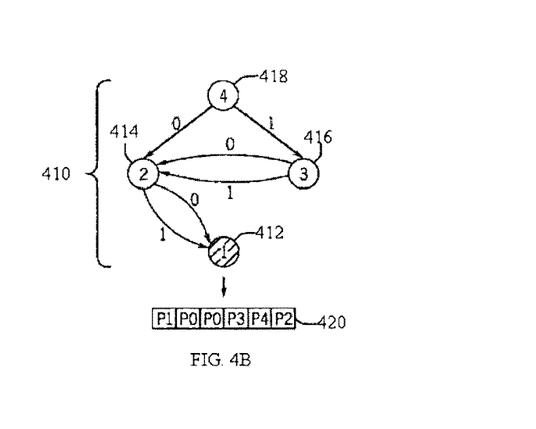

FIG. 4B is a schematic diagram of ISG 410 that is generated from the binary tree 400 in FIG. 4A, according to an example. In some cases, only one ISG 410 may be generated from the tree 400, as shown in FIG. 4A. However, in other cases, the tree 400 may be split into a number of layers, and multiple shape graphs may be generated from the multi-layer tree.

The shape graph 410 may include a dark (or black) node 412 and a number of white nodes 414, 416, and 418. The nodes in the shape graph 410 represents respective sub-trees within the binary tree 400.

In the example of FIG. 4A, only the leaf nodes 406A-406F of the tree 400 are associated with sub-rule set (in the form of P0, P1, P2, P3, and P4). The leaf nodes 406A-406F are merged into a sub-tree represented by the node 412 in the shape graph 400. The respective shape ID "1" is associated with the node 412. The node 412 is a dark node since the corresponding leaf nodes 406A-406F of the tree 400 are dark nodes.

However, in other cases, the intermediate nodes can also be associated with sub-rule set. It depends on whether or not the node of the tree is a dark node.

The node 414 in the shape graph 410 represents the sub-tree including nodes 404A, 404C, and 404D of the tree 400. The node 414 is associated with the shape ID "2." The nodes 416 and 418 of the shape graph, assigned shape IDs "3" and "4" respectively, represent the sub-tree including the node 404B, and the sub-tree including the node 402. Each of the nodes 414, 416, and 418 are white nodes since the respective nodes of the tree 400 are not associated with sub-rule set.

In different examples, if at least one of the intermediate nodes of the tree 400 is associated with sub-rule set, then the corresponding node of the shape graph 410 would be considered a dark node.

As further depicted in FIG. 4B, the shape graph 410 is associated with an indexing array 420. The indexing array 420 has a number of positions, where each position is pointed to by a respective index. The positions of the indexing array 420 include respective sub-rule set, which in the example of FIG. 4B includes the following: P1, P0, P0, P3, P4, and P2. The indexes that point to corresponding positions of the indexing array 420 can start at 0. Thus, an index value of 0 would point to the first position of the indexing array 420, while an index value of 3 would point to the fourth position (containing P3) of the indexing array 420.

Since the shape graph 410 is associated with the indexing array 420, the shape graph 410 can be referred to as an indexed shape graph.

Upon receiving a packet, a search (lookup) of the shape graph 410 can be performed, which would produce a respective index value that can be used as an accessing position of the indexing array 420 to retrieve a corresponding sub-rule set.

There are three types of rule update requests: modification, insertion and deletion of a rule. An update of rule may affect one or several segments in the g-Set Array.

Figure 5:
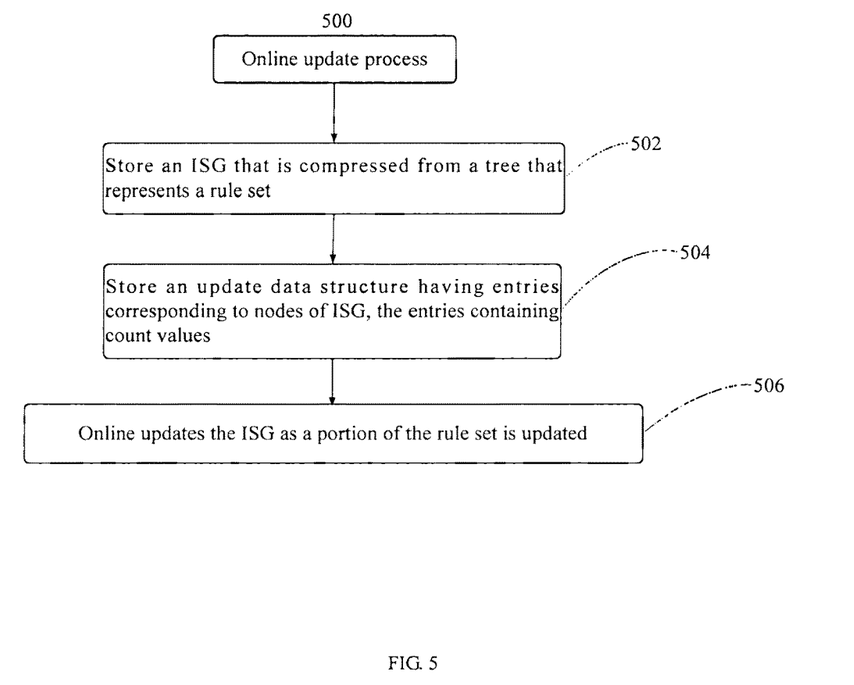
FIG. 5 illustrates an example flow chart of a process of performing online update of SCI according to an example herein.

FIG. 5 is a flow diagram of a process of performing online update of SCI 500 in response to an update of a rule set, in accordance with some implementations.

The process stores (at 502) an ISG that is compressed form a tree that represents a rule set. And then the process stores (at 504) an update data structure having entries corresponding to the nodes of ISG, the entries containing count values. In response to an update of a portion of the rule set, the process online updates (at 506) an ISG using information in the update data structure.

Modifications of a rule set can result in the insertion or deletion of nodes in the tree, as well as the corresponding changes to the ISG. Due to the bottom-up shape identification property, modification of a tree node only affects the shapes of the ancestor nodes in the tree. As a result, the affected tree nodes can be re-labeled by performing a bottom-up reconstruction of the affected nodes of the tree. Note that the child nodes of the affected tree nodes are not affected, and thus the shape IDs of the child nodes would not be changed.

When a prefix (which is associated with a new sub-rule set) is inserted into the rule set. A shape graph update process identifies the tree nodes that are affected by the insertion, and removes the respective shape IDs of these tree nodes. The insertion of the prefix may change the sub-rule set flag of an existing tree node.

When we re-label a tree node, the counter of its original shape ID is reduced by 1 and searched in the shape graph based on the triple—<left sub-tree shape ID, right sub-tree shape ID, validity flag>. Validity flag-Whether the root node of the sub-tree is a dark node. If the search fails, which means a new shape needs to be created, the triple is taken as the key, a new shape ID is allocated as the value, and the new key-value pair is inserted into the shape graph. If the triple already exists, the tree node is be labeled with the corresponding shape ID and the counter is increased by 1. As mentioned above, when a tree node is re-labeled, the counter of its original shape ID is reduced by 1. If the counter of a shape became 0, which means there is no tree node associating with this shape ID; its occupancy may be recycled in the on-chip memory.

Insertion

When a new prefix is inserted into the tree as a dark node, the indexed shape graph will be updated correspondingly. The insertion procedure of update is going through a bottom-up way. As the affected sub-trees are only on the path between the target node and the root node, the sub-trees can be re-labeled along the path to complete the update. The pseudo codes of insertion are shown as follow:

```
1: Insertion_Update_ISG(cur_nod, root)
2: Begin
3: while (cur_node) do //the parent of root is null
4:    if (cur_node is a leaf node)
5:    then
6:       [Initialize the number of left side dark nodes and shape ID]
7:       lShape = rShape = 0
8:    else
9:       [Decrease the counter of orginial shape of cur_node by 1, if the counter is equal to 0, recycle the shape]
10:      lShape = shape ID of left sub-trie
11:      rShape = shape ID of right sub-trie
12:      [Compute the number of left side dark nodes]
13:   if (triple<lShape, rShape, validity flag> exists in hash table)
14:   then
15:      shape_id = mapping(triple<lShape, rShape, validity flag>);
16:      shape_counter[shape_id]++
17:   else
18:      shape_id = [allocate a new shape ID]
19:      shape_counter[shape_id] = 1
20:      [Insert a pair (triple<lShape, rShape, validity flag>, <shape_id, number of left side dark nodes>) into hash table]
```

```
21:    cur_node.shape = shape_id
22:    cur_node = cur_node's parent
23: End
```

Update Algorithm of Insertion

Deletion

Figure 6A:
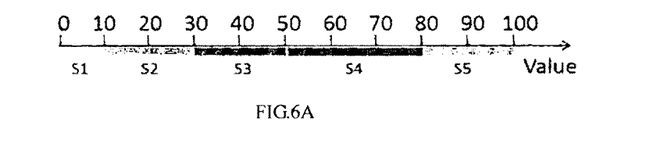
FIG. 6A illustrates an example of one dimensional space for 1-field rule set.
Figure 6B:
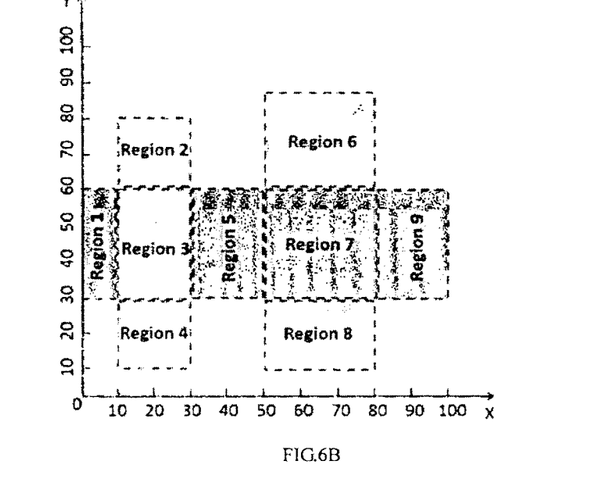
FIG. 6B illustrates an example of two dimensional spaces for 2-field rule set.

If a prefix is removed from the tree, the procedure of update for the indexed shape graph is also going through a bottom-up way. Similar to insertion, the affected sub-tries are on the path from the target node to the root node of the tree. Here, if the target node is a leaf node, this leaf node is removed in the tree, and then the operation is moved to its parent node. If the parent node is a leaf node, the similar process will be done recursively until reaching an ancestor node which is not a leaf node. After that, the sub-tree associating with the affected nodes bottom-up will be re-labeled. The pseudo codes of deletion are shown as follow:

FIG. 6B illustrates an example of two dimensional spaces for 2-field rule set. In FIG. 6B, the two dimensional space contains 9 regions. The rule 1 is replicated in the following three regions: Region 2, Region 3 and Region 4. Rule 2 is replicated in Region 6, Region 7 and Region 8. And rule 3 is replicated in Region 1, Region 3, Region 5, Region 7 and Region 9.

The rule replication grows with the size of rule set and the number of fields. The rule replication will make the performance of packet classifier poor as the more the rule replication is, the higher the complexity will be. The method presented in this disclosure can significantly reduce the rule replication for multi-dimensional packet classification.

```
1: Deletion_Update_ISG(cur_node, root)
2: Begin
3: while(cur_node and cur_node is a leaf node) do //the parent of root is null
4:    [Decrease the counter of orginial shape of cur_node by 1, if the counter is equal to 0, recycle the shape]
5:    [remove the cur_node in the trie]
6:    cur_node = cur_node's parent
7: while(cur_node) do //the parent of root is null
8:    [Decrease the counter of orginial shape of cur_node by 1, if the counter is equal to 0, recycle the shape]
9:    lShape = shape ID of left sub-trie
10:   rShape = shape ID of right sub-trie
11:   [Update the number of left side dark nodes]
12:   if (triple<lShape, rShape, validity flag> exists in hash table)
13:   then
14:      shape_id = mapping(triple<lShape, rShape, validity flag>)
15:      shape_counter[shape_id]++
16:   else
17:      shape_id = [allocate a new shape ID]
18:      shape_counter[shape_id] = 1
19:      [Insert the pair (triple<lShape, rShape, validity flag>, <shape_id, number of left side dark nodes>) into hash table]
20:      cur_node.shape = shape_id
21:      cur_node = cur_node's parent
22: End
```

When the sub-rule set is updated, only the sub-rule set of a dark node is changed. As a result, the update of the ISG in response to a change of sub-rule set is relatively simple, since a lookup procedure can be performed to find the node of the shape graph corresponding to the updated sub-rule set, and the corresponding position in the indexing array can be updated with the new sub-rule set.

The online update process discussed above can also be applied in a cold-start scenario, which is a scenario when the rule set is initially empty. The online update process can be performed as content is added to the rule set. The construction of the shape graph can use the insertion procedure discussed above.

An update of rule may affect one or several segments in the g-Set Array. SA/DA tree of the affected segments are reconstructed and the ISG is updated accordingly to represent the change in the tree. A newly updated ISG is constructed in CPU and then downloaded into FPGA for lookup operation.

FIG. 6A illustrates an example of one dimensional space for 1-field rule set. The bounds of each rule are gathered and plotted on an axis as shown in FIG. 6A, i.e. Axis for one-field rule set.

The rule set is separated into 5 segments from S1 to S5. The rule 3 will be replicated in all of the 5 segments.

While the disclosure has been described with respect to a limited number of example embodiments, those skilled in the art, having benefit of this disclosure, will appreciate that other example embodiments can be devised which do not depart from the scope of the disclosure as disclosed herein. Accordingly, the scope of the disclosure should be limited only by the attached claims.

What is claimed:

1. An SCI (Split, Compression and Intersection) packet classifier comprising:
   a construction module to generate a rule ID array, N pairs of Indexed Shape Graphs (ISGs) and three binary search trees,
   a lookup engine to look up the binary search trees and ISGs to find a highest priority rule matching an incoming packet and to output a corresponding rule ID.

2. The SCI packet classifier of claim 1, wherein
   the lookup engine comprises an off-chip memory, an on-chip memory and a pipeline in FPGA,
   the rule ID array is downloaded into the off-chip memory,
   the N pairs of ISGs and the three binary search trees are downloaded into the on-chip memory.

3. An SCI (Split, Compression and Intersection) lookup engine, comprising:

a storage medium to store three binary search trees of a source port, a destination port and a protocol and N pairs of Indexed Shape Graphs (ISGs);

an index mapping component, a priority resolver component, wherein for an incoming packet, the SCI lookup engine is to lookup the binary search tree to locate a segment index of each field of the incoming packet, the index mapping component is to calculate root entries of N pairs of ISGs based on the segment indexes, the SCI lookup engine is to search a source IP address and a destination IP address in the N pairs of ISGs through pipelines in parallel, and the priority resolve component is to return a highest priority matched rule ID.

4. The SCI lookup engine of claim 3, wherein the product of index numbers of a source port, a destination port and a protocol are used as index numbers to locate a corresponding ISG entry.

5. A method of construction of SCI (Split, Compression and Intersection) comprising:

splitting a rule set into a plurality of groups;

compressing each group into a pair of Indexed Shape Graphs (ISGs), a first ISG for a source address (SA) field and a second ISG for a destination address (DA) field, leveraging intersection to combine the SA ISG and the DA ISG; and calculating a matched rule ID.

6. The method of claim 5, wherein splitting the rule set into the plurality of groups comprises:

splitting the rule set into a plurality of groups according to a distribution of overlapping frequencies of rules.

7. The method of claim 5, further comprising:

splitting the rule set by using any combination of the fields.

8. The method of claim 5, further comprising:

for each group, collecting bound values for each of a source port, a destination port and a protocol; and distributing the rule set into a list of segments according to the bound values.

9. The method of claim 5, further comprising:

returning a first intersected rule ID between two ordered rule sets.

10. The method of claim 8, wherein each of the segments comprises a plurality of rules matching a specified range of 3-tuples.

11. The method of claim 8, further comprising:

for each segment, constructing an SA binary search tree and constructing a DA binary search tree by the rules, for each SA or DA binary search tree, there is an associated index array (i-Set Array), each i-Set Array comprising a sub-rule set matching a specified source or destination IP prefix.

12. The method of claim 8, wherein each segment comprising a sub-rule set that can be duplicated in multiple segments is called a sub-segment, and a number of segments is a product of the numbers of a source port, a destination port and a protocol in the sub-segments.

13. The method of claim 8, wherein the list of segments of a group is called a g-Set Array, the method further comprising, in response to an update of a rule affecting segments in the g-Set Array, reconstructing the SA/DA binary search trees of one or more affected segments and updating the ISG to represent a change in the binary search trees.

14. The method of claim 13, further comprising constructing a newly updated ISG in a CPU and downloading it into an FPGA for a lookup operation.

15. The method of claim 5, further comprising online updating the SCI, online updating the SCI comprises:

selecting one or more segments in a g-set Array which are affected by an update of a rule;

reconstructing SA/DA binary search trees of the selected segments, updating a ISG and downloading the ISG into an FPGA for a lookup operation.

* * * * *